UNITED STATES PATENT OFFICE.

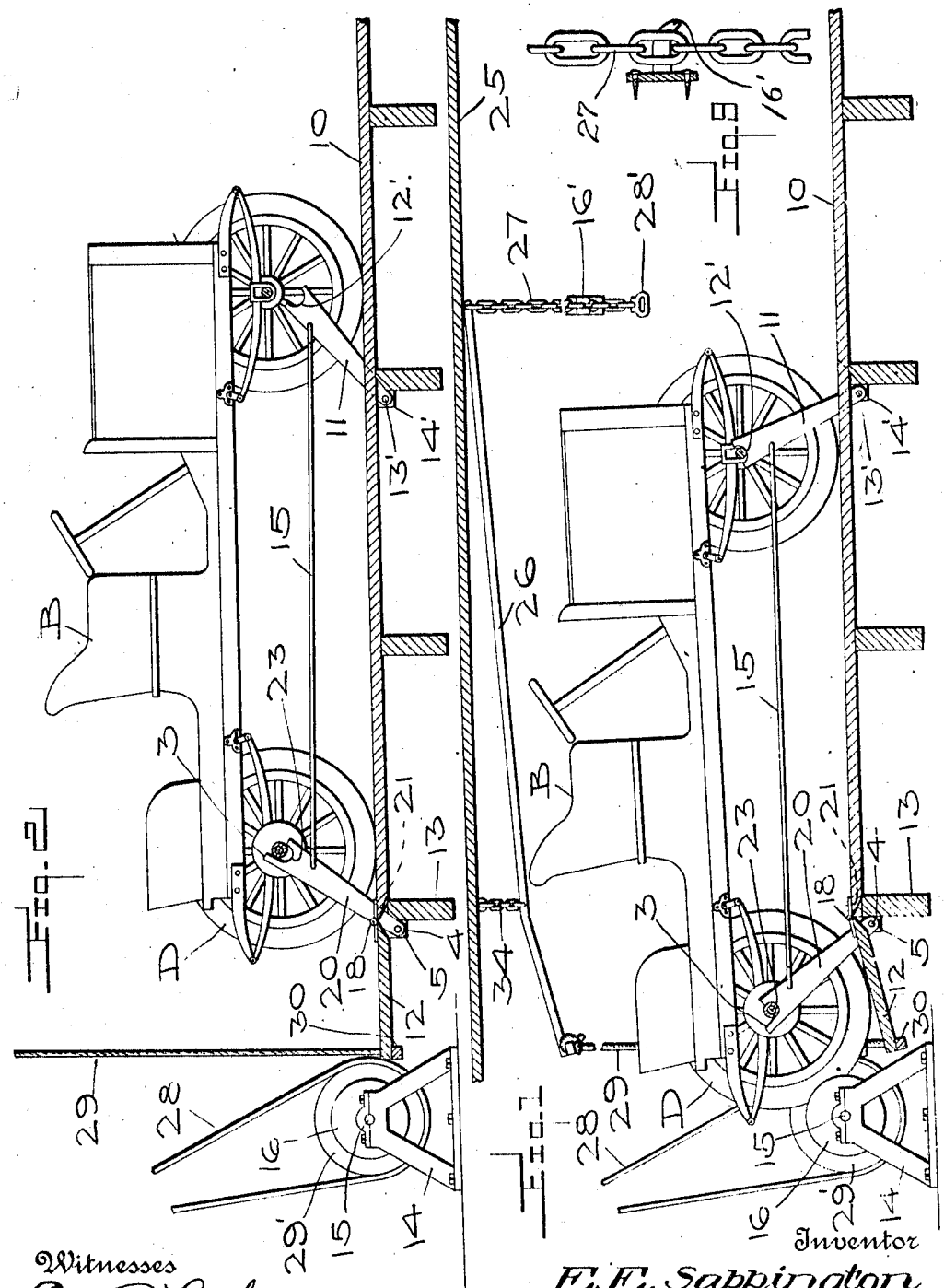

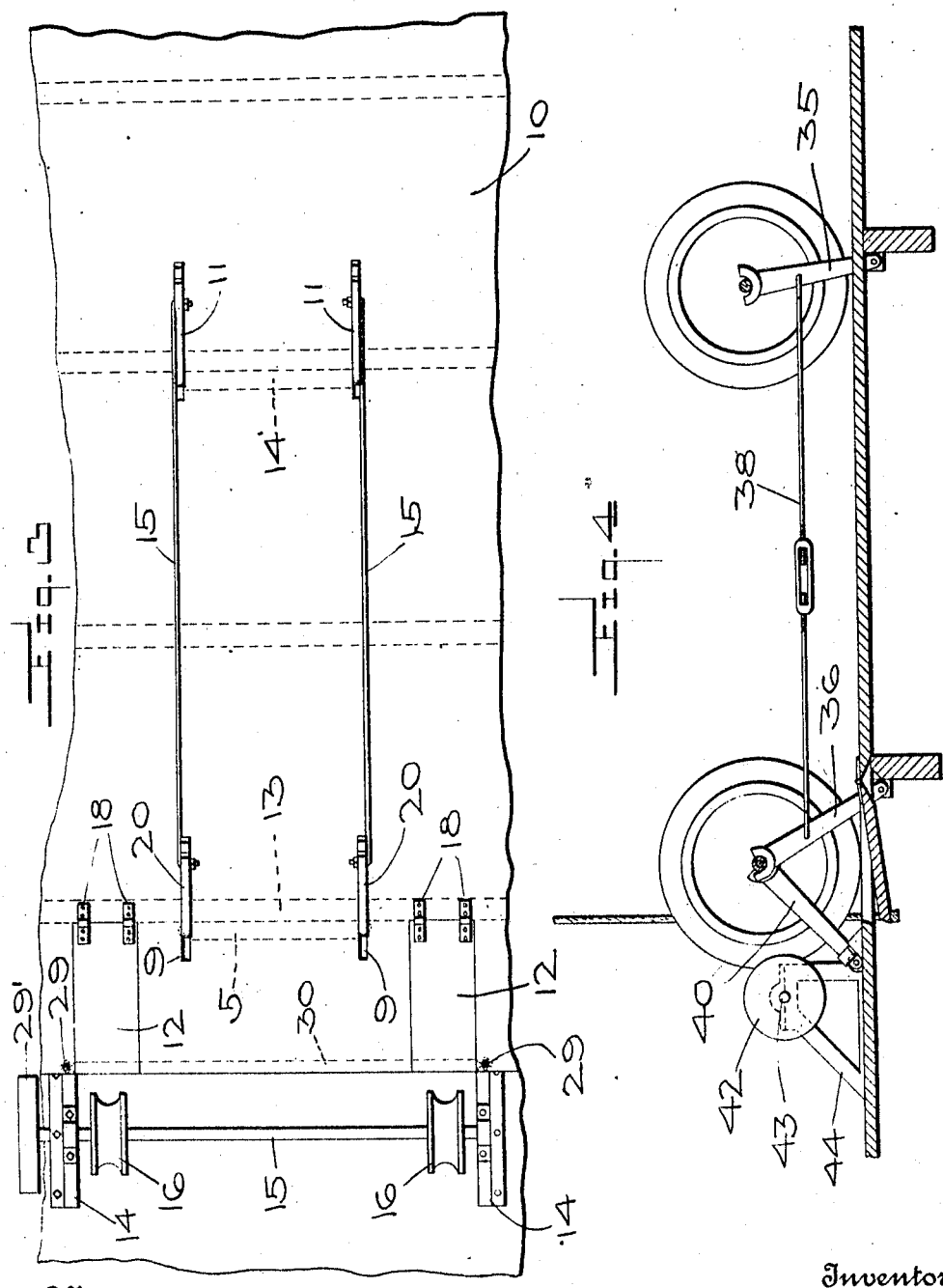

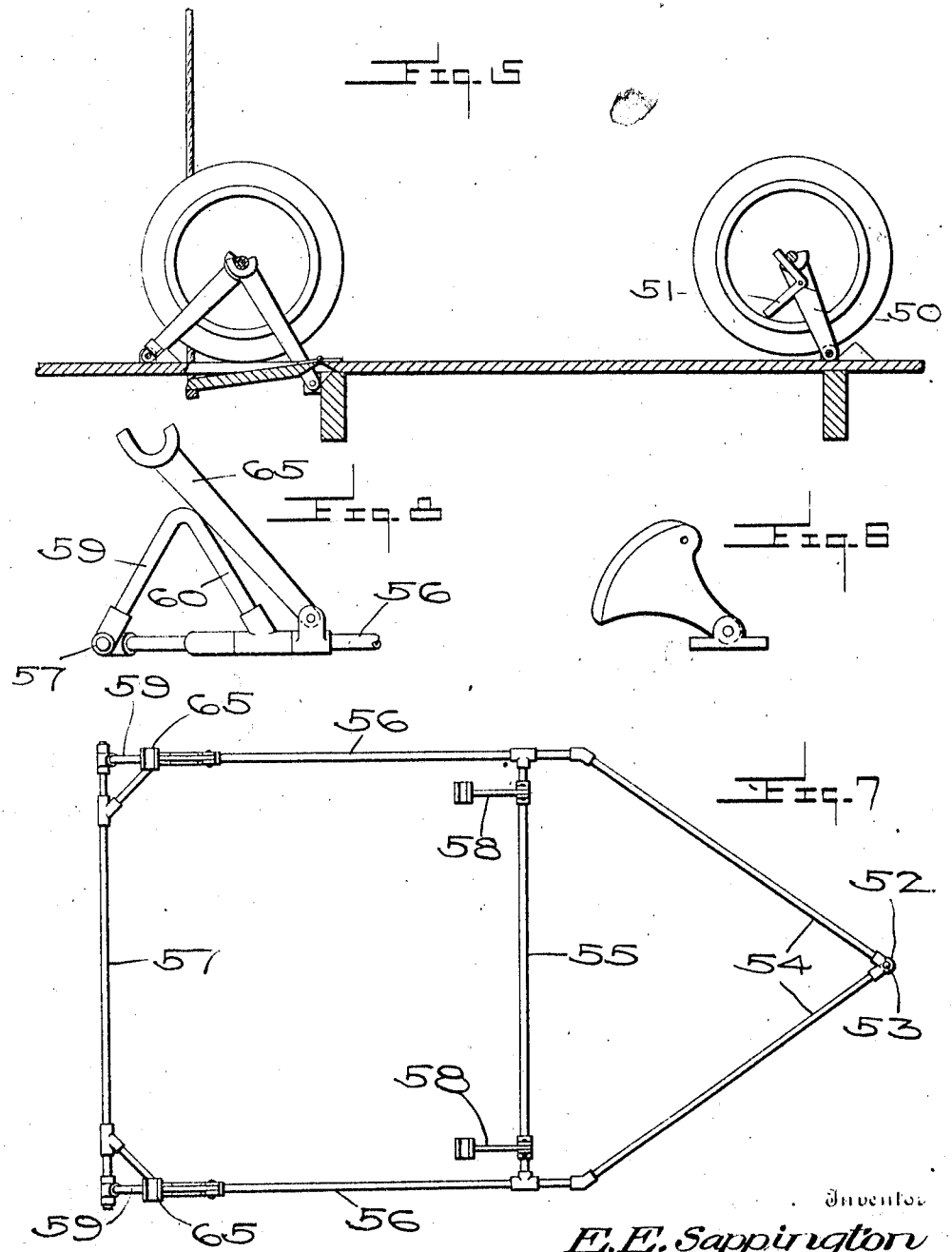

ELIJAH E. SAPPINGTON, OF SPOKANE, WASHINGTON.

AUTOMOBILE POWER MECHANISM.

993,556.

Specification of Letters Patent.   Patented May 30, 1911.

Application filed July 15, 1909. Serial No. 507,754.

*To all whom it may concern:*

Be it known that I, ELIJAH E. SAPPINGTON, a citizen of the United States, residing at Spokane, in the county of Spokane and State of Washington, have invented certain new and useful Improvements in Automobile Power Mechanism, of which the following is a specification.

This invention relates to an automatic jack and power transmission device.

The primary object of my invention is to provide a pivotally held platform, and a pivotally held supporting means, together with a power-transmission device, so arranged that said platform may be dropped, to bring the driving end of a motor which is carried thereon, into contact with said supporting means, and the driving wheels against said transmission device.

Another object of this invention is, to provide a plurality of jacks so secured and positioned, that an automobile may be driven upon the jacks to automatically raise the vehicle.

Another object is to provide a set of pivotally held jacks arranged to receive, support and tilt a motor car, so that its driving wheels will contact with and against two friction wheels rotating a driving shaft.

Another object, is to provide a mechanism, with which a motor car is brought into contact, so that the vehicle is raised and brought into contact with two friction wheels against which the driving wheels of the vehicle are forced under weight pressure or gravity.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification and in which like numerals of references indicate similar parts in the several views, Figure 1 is a side elevation of a set of jacks constructed according to my invention with the floor in section showing the motor vehicle as being supported, against the power transmission. Fig. 2 shows a side elevation of the transmission shaft and the connected friction wheels with the floor in section, disclosing the supporting position of the jacks. Fig. 3 shows a top view of my invention. Fig. 4 shows a modification, Fig. 5 shows a further modification. Fig. 6 shows a modification of one of the jacks. Fig. 7 shows a top view of a transportable frame to be provided with suitable carrying jacks. Fig. 8 shows an enlarged elevational detail of the supporting jack shown in Fig. 7. Fig. 9 shows the holder as used in my invention in side view.

The aim of my invention is broadly, to provide a plurality of rigid pivotally held members, with which a vehicle is brought into contact so that the members are tilted to carry up and hold the vehicle in suspended and tilted position against the wheels of a transmission shaft, so that the motor of said vehicle may be used to rotate said transmission shaft.

In the drawings, 10 designates the floor of a carriage house, which is provided at the rear with the two trap doors 12, which are supported by means of the hinges 18. Adjacent to the doors 12 are secured the supporting brackets 14, carrying the transmission shaft 15, to which are adjustably held the two grooved friction wheels 16. The trap doors 12 are supported by means of the bar 30, secured to the ends thereof, as shown in Fig. 2. The vehicle is supported by four rigid members marked 11 and 20, which are in the form of and serve as jacks by means of which the vehicle is raised. Each rear jack is shown as having a rear prong 3, and the saddle depression 23. The rear jacks 20, are held upon the pins 4, carried by the bar 5, secured to one of the joists 13. These jacks extend through a slot 9, within the floor 10. The forward jacks 11, have the saddle depression 12′, and are pivotally mounted upon the pins 13′, carried by the bar 14′, which may be secured upon the floor, as shown in Fig. 2. These jacks are connected in sets of two by means of the connecting rods 15.

In their forwardly inclined position, the rear jacks are stopped against the floor portion 21, forming the end of the slot, as shown in Fig. 2. The forward jacks are held at a greater inclination, than the rear jacks, so that a motor vehicle may be backed over these forward jacks, to bring the rear axle into the rear jacks. In their tilted position the front jacks hold the wheels above the floor 10, the rear wheels however being suspended and held against the friction wheels 16.

To the ceiling 25 of the garage is secured the hanger 34 carrying the lever 26 from which depends the operating member 27 at the lower end provided with a suitable grip or handle 28'. The opposite end of this lever or member 26 is provided with a pliable connection 29 which is secured to the bar 30. The handle 28', is secured to the slotted holder 16' by means of the chain 27, to hold the doors 12 in a closed position. The hinges 18 are secured to the top part of the trap doors 12, and the jacks 20 are held within the slots 9 within the floor 10 and are arranged to normally tilt forward. The forward position of these jacks is determined by means of a stop edge 21 so that all of these jacks are normally held in a forwardly inclined position.

When the instrumentalities have been properly arranged the operation of my device is as follows. The motor car B as shown in the drawings is backed into the garage and so guided, that a non-rotating part of the running gear of the vehicle will contact with the prong 3 of the rear jacks. The vehicle is backed with sufficient force to throw the pivotally held jacks backward, until the wheels D, contact with the trap doors, the front jacks in the meantime are raised to be engaged by the forward axle to carry the front wheels off the floor. The doors 12 are then dropped, to bring the vehicle wheels D into contact with the friction wheels 16. After the center of gravity of the moving pivotally held jacks is passed, the vehicle will drop rearwardly so that the driving wheels D of the motor car will firmly contact with the friction wheels 16 which are so positioned that these two friction wheels 16 will engage with the driving wheels D of the motor car. The rear part of the motor car will then be held suspended, and in a tilted condition against these friction wheels 16. On starting the motor of the car, the wheels D are rotated and the rotary movement is transmitted to the friction wheels 16 rotating the transmission shaft 15 and the connected pulley 29', over which is passed a suitable belt 28 so that certain machinery such as is used in generating electric lights and making ice may be driven. In order to release the car or motor vehicle, the operator tilts the lever 26 to carry the trap doors upward into contact with the wheels D, thus raising the rear of the vehicle so that upon pushing the car forward the jacks will be tilted forward permitting the vehicle to become detached from the jacks and rest on the platform. The jacks will then be held in their forward tilted position, to again receive the vehicle in the manner set forth.

My invention is susceptible of several modifications and in Fig. 4 I disclose four similar jacks marked 35 and 36 respectively. The jacks 35 are arranged to receive a non-rotating part of the forward end of the vehicle, as the front axle supports for instance, while the rear jacks 36 are arranged to receive a non-rotating part of a vehicle as has been previously described. In this instance the forward and rearwardly positioned jacks are connected by means of the connecting rods 38 provided with a turn buckle, so that the relative positions of the jacks may be nicely adjusted. This arranged ment permits the motor car being entirely lifted off of the ground and held in a suspended condition. In Fig. 4 I have shown the additional stop arms 40 which incline forwardly and are so positioned that as the rear jacks 36 are tilted backward, a suitable part of the vehicle will contact with those arms 40 to determine the position of the vehicle. These arms 40, it will be noticed serve in the capacity of brace bars. A set of suitably held friction wheels can be brought into contact with the driving wheels of the vehicle. In Fig. 4 I have shown a modification in which two extra arms are used and in connection with which I show the friction wheels 42 mounted upon the shaft 43 supported within the standards 44. As shown in Fig. 4 the connecting rod 38 is of such a length, that when the vehicle is at rest these forward jacks are held in a slightly inclined position so that the center of gravity will be to the rear of the pivot points of these front jacks 35. The operation of these jacks is of course to automatically raise the motor car so that any repairing to be done under the car may be conveniently accomplished.

In the modification as shown in Fig. 5 I use two sets of jacks, but each jack is independently supported. In this modification the jacks 50 are provided with the bell cranks 51, to hold the axle to the jacks.

While I have described the jacks as pivotally secured to the floor this is not absolutely necessary and in Fig. 7 I show a frame made of suitable steam or water pipe which is suitably anchored or otherwise secured to the floor of the carriage house or garage and carries four jacks arranged to raise the car as has been previously described.

The modification shown in Fig. 7 comprises a portable frame made of the forward pipe sections 54 which are provided with the forward loop 52 arranged to receive a suitable spike 53 by means of which this frame is secured at its forward end to the floor. Extending from these obliquely held tube members 54, are the two side members 56, which at the rear are secured to the transversely held pipe 57, and at their forward ends are braced by means of the transversely positioned pipe 55. The forward tube of pipe 55 carries the forwardly positioned jacks 58, while the rear pipe or tube 57 carries the rear jacks 65. Extending upwardly from the frame are the pipe sections 60 and 59 which are connected in V-shape, and against which the rear jacks 65 strike and are stopped to hold the jacks in a desired position.

In automobile construction it is especially desirable that the wheels should be relieved of any unnecessary strain, and in my invention I provide a mechanism by means of which the motor car is suspended while not in use, so that no unneccessary strain is imposed upon the elastic tires of the wheel. In addition to this, in providing the portable frame with a transmission shaft, the power of the automobile motor may be used to drive suitable auxiliary machinery. Where this supporting frame is made of pipe sections, these can be securely packed in transportation to be readily assembled in rearranging the parts. The holder 16', as shown in Fig. 9, is in the form of a slotted beak-hook into which the chain links are inserted, in adjusting the pivotally held or base sections 12.

From the foregoing it will be seen that I provide an automatic vehicle jack which is actuated in bringing the vehicle into collision with the supporting jacks to remove any carrying strain from the wheels. My device is light, readily adjustable, and positive in its operation. The jacks of course are held in spaced relation, and are arranged to operate simultaneously.

And having thus described my invention, what I claim as new and desire to secure by United States Letters Patent is:—

1. The combination with a supporting base of a plurality of pivotally swinging jacks mounted on said base and having bearings at their upper ends, connections between the jacks, a hinged base section adjacent certain of said jacks, means for controlling said hinged base section, a suitably supported transmission shaft positioned adjacent to said swinging jacks, and fixed frictional wheels secured to said shaft, said jacks being arranged to support and swing a motor vehicle in a vertically and rearwardly extending arc, whereby the wheels of the rear of the vehicle may be moved into engagement with said friction wheels.

2. The combination with a supporting base, as a floor, of two sets of pivotally swinging jacks held in spaced relation having vehicle engaging bearing at their upper ends, a suitably supported transmission shaft positioned adjacent to said swinging jacks, frictional wheels secured to said shaft, a hinged support adjacent one set of jacks, means for controlling said hinged support adapted to support the rear wheels of a vehicle to lower said vehicle, whereby the rear wheels of the vehicle will be lowered into engagement with said frictional wheels.

3. The combination with a base for supporting a motor vehicle thereon, of a transmission shaft, friction wheels carried by said shaft, two sets of independently swinging and pivotally held jacks movable toward and away from said friction wheels, said jacks adapted to carry the vehicle through an arc to said friction wheels whereby the rear wheels of the vehicle are adapted to rest on said friction wheels.

4. In combination, two pivotally held rear jacks, a drop floor supported adjacent said jacks, two forward jacks, adjustable means for connecting said jacks, means to adjust said drop floor, said jacks adapted to engage and hold a motor vehicle, a drive shaft, a friction wheel on the shaft the driving wheels of said motor vehicle contacting with said friction wheel, and means for raising said drop floor, whereby the vehicle is raised from the friction wheel and swung on said jacks.

5. The combination with a support, a suitably held drive shaft on the support, of drop floor sections, two rear jacks pivoted adjacent and movably coöperating with said floor sections, two forward jacks pivoted on the support, means to connect said jacks, means to adjust said drop floor, suitable friction wheels on the drive shaft, said base supporting a motor vehicle engaging with said jacks to swing thereon and be carried through a vertical arc thereby, whereby the drive wheels of said vehicle are first raised from the base and then lowered into contact with said friction wheels.

In testimony whereof I affix my signature, in presence of two witnesses.

ELIJAH E. SAPPINGTON.

Witnesses:
L. L. WATTS,
A. KRAMER.